United States Patent
Yamane

(10) Patent No.: US 12,181,425 B2
(45) Date of Patent: Dec. 31, 2024

(54) IMAGE PICKUP DEVICE AND IMAGE GENERATION METHOD

(71) Applicant: Kioxia Corporation, Tokyo (JP)

(72) Inventor: Takeshi Yamane, Tsukuba Ibaraki (JP)

(73) Assignee: KIOXIA CORPORATION, Tokyo (JP)

( * ) Notice: Subject to any disclaimer, the term of this patent is extended or adjusted under 35 U.S.C. 154(b) by 330 days.

(21) Appl. No.: 17/880,764

(22) Filed: Aug. 4, 2022

(65) Prior Publication Data

US 2023/0144201 A1    May 11, 2023

(30) Foreign Application Priority Data

Nov. 5, 2021   (JP) .................................. 2021-181351

(51) Int. Cl.
*G01N 23/083* (2018.01)
*G01N 23/04* (2018.01)
*G01N 23/18* (2018.01)

(52) U.S. Cl.
CPC ........... *G01N 23/083* (2013.01); *G01N 23/04* (2013.01); *G01N 23/18* (2013.01); *G01N 2223/6116* (2013.01)

(58) Field of Classification Search
CPC ...... G01N 23/083; G01N 23/04; G01N 23/18; G01N 2223/6116
See application file for complete search history.

(56) References Cited

U.S. PATENT DOCUMENTS

2009/0129543 A1* 5/2009 Le Gros ................... G21K 7/00
                                                         359/393
2011/0158502 A1* 6/2011 Meshulach ........ G01N 21/9501
                                                            382/145

(Continued)

FOREIGN PATENT DOCUMENTS

JP          H0528545 A  *  2/1993
JP          3274446 B2     4/2002

(Continued)

OTHER PUBLICATIONS

Herminso Villarraga-Gómez, Ericka L. Herazo, Stuart T. Smith, "X-ray computed tomography: from medical imaging to dimensional metrology", 2019, Precision Engineering, vol. 60. (Year: 2019).*

(Continued)

*Primary Examiner* — David P Porta
*Assistant Examiner* — Richard O Toohey
(74) *Attorney, Agent, or Firm* — Foley & Lardner LLP

(57) ABSTRACT

An image pickup device includes a disk with an aperture through which X-rays can transmit. The device includes a vacuum suction ring having an inner peripheral ring and an outer peripheral ring having different heights, which fixes a position of the aperture with respect to a subject. The device includes a rotation stage that holds the subject and the disk with an aperture fixed by the vacuum suction ring and can rotate at a desired angle about a rotation axis along a direction perpendicular to a surface of the subject, and a one-dimensional detector in which line-shaped pixels are disposed at a predetermined pixel pitch. An imaging mirror forms an image of X-rays transmitted through the subject and the aperture on the one-dimensional detector. A control analysis unit corrects coordinates of an image intensity profile and reconstructs an image of the subject from the image intensity profile after the correction.

15 Claims, 14 Drawing Sheets

(56) References Cited

U.S. PATENT DOCUMENTS

2018/0261352 A1  9/2018  Matsuyama et al.
2020/0033488 A1  1/2020  Yamane
2021/0231905 A1  7/2021  Yamane

FOREIGN PATENT DOCUMENTS

JP    6478433 B2     3/2019
JP    2020-016543 A  1/2020

OTHER PUBLICATIONS

Villarraga-Gómez, Herminso, et al. "Improving the dimensional accuracy of 3D X-ray microscopy data.", 2022, Measurement Science and Technology 33.7 (Year: 2022).*

* cited by examiner

SUBJECT
(OBSERVATION REGION)

RECONSTRUCTION IMAGE
(FIRST)

RECONSTRUCTION IMAGE (mth)

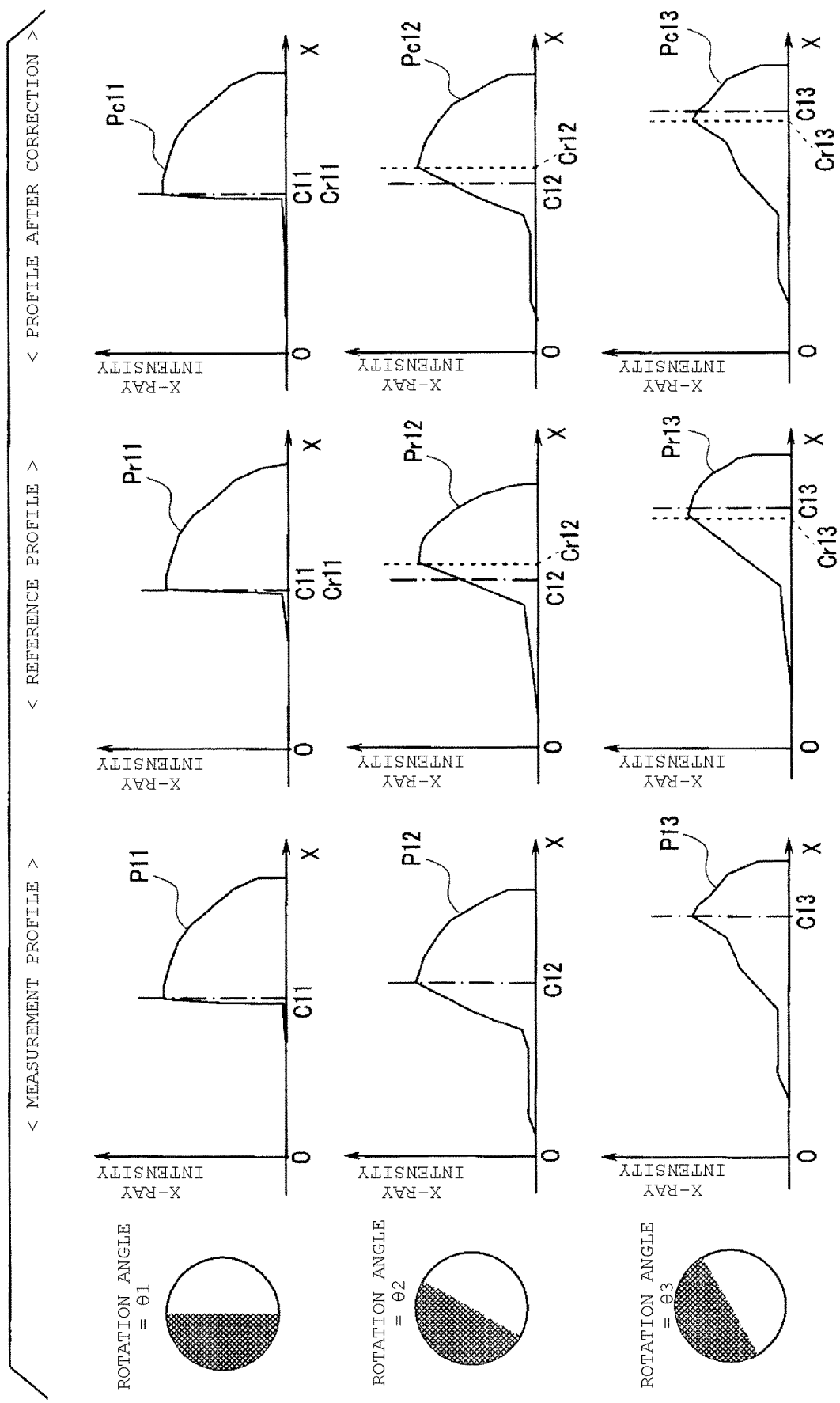

IMAGE PICKUP DEVICE AND IMAGE GENERATION METHOD

CROSS-REFERENCE TO RELATED APPLICATION(S)

This application is based upon and claims the benefit of priority from Japanese Patent Application No. 2021-181351, filed Nov. 5, 2021, the entire contents of which are incorporated herein by reference.

FIELD

Embodiments relate to an image pickup device and an image generation method.

BACKGROUND

A transmission X-ray microscope is known as a device for observing a structure of a subject with high resolution and non-destructively.

DESCRIPTION OF THE DRAWINGS

FIG. 16 is a diagram showing a position correction method of an image intensity profile according to the second embodiment.

DETAILED DESCRIPTION

An object of at least one embodiment is to provide an image pickup device and an image generation method capable of acquiring a reconstruction image with high accuracy.

In general, according to at least one embodiment, an image pickup device of at least one present embodiment includes a sample holding plate having an aperture through which imaging light applied to a subject is capable of being transmitted. Further, the image pickup device also includes a fixing member that has a first surface to which the subject is capable of being fixed and a second surface to which the sample holding plate is capable of being fixed and which is formed in parallel with the first surface at a height different from that of the first surface, and fixes a position of the aperture with respect to the subject. Further, the image pickup device also includes a rotation member that holds the subject and the sample holding plate fixed by the fixing member, and is capable of rotating at a desired angle about a rotation axis along a direction perpendicular to a surface of the subject, and a detector in which a plurality of line-shaped pixels having a line-shaped light receiving surface extending in a first direction are disposed side by side in a second direction orthogonal to the first direction. Further, the image pickup device includes an imaging optical member that forms an image of the imaging light transmitting through the subject and the aperture on a detection surface of the detector and an image processing unit that corrects coordinates of an image intensity profile detected by the detector and reconstructs an image of the subject from the image intensity profile after correction.

First Embodiment

Hereinafter, embodiments will be described with reference to the drawings. The image pickup device of the embodiment is, for example, a transmission X-ray microscope. The transmission X-ray microscope is an imaging optical system using electromagnetic waves having a short wavelength, and has a high resolution of about several tens nm. Further, since X-rays have a high transmittance, it is possible to observe an internal structure of a relatively thick subject such as a silicon wafer where a semiconductor device or the like is formed on a surface thereof.

Figure 1:
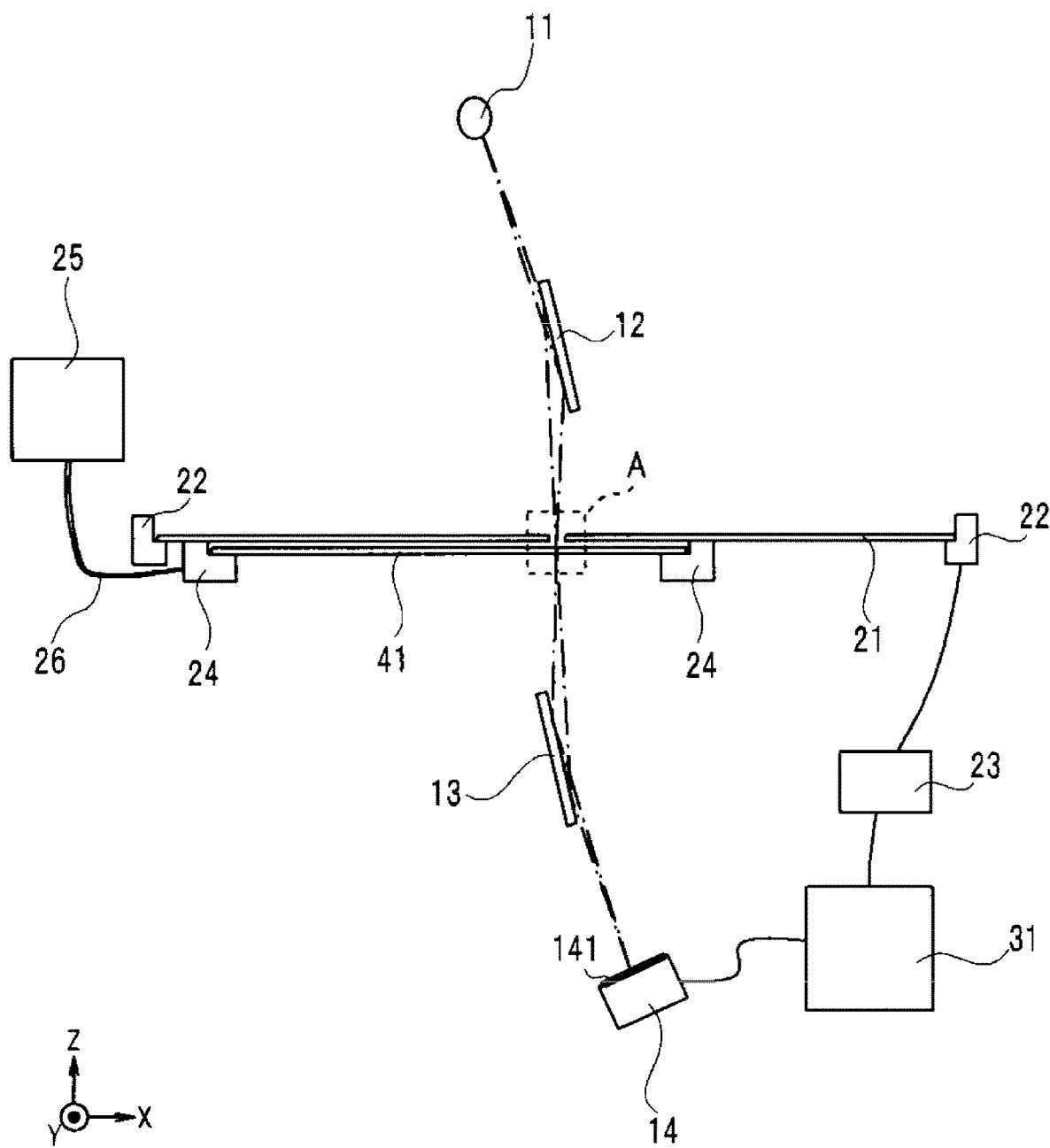
FIG. 1 is a schematic view showing an example of a configuration of an image pickup device according to at least one embodiment.

FIG. 1 is a schematic view showing an example of the configuration of the image pickup device of at least one embodiment. The image pickup device includes a light source 11, an illumination mirror 12, an imaging mirror 13, and a one-dimensional detector 14. Further, the image pickup device includes a disk 21 with an aperture, a rotation stage 22, a stage drive unit 23, a vacuum suction ring 24, and a control analysis unit 31.

The light source 11 is an X-ray source that generates X-rays by irradiating a target made of molybdenum or the like with an electron beam. The illumination mirror 12 is used to collect X-rays emitted from the light source 11 toward an aperture 211 of the disk 21 with an aperture. For the illumination mirror 12, for example, a Montel mirror is used.

The disk 21 with an aperture as the sample holding plate is a thin plate-shaped disk having an aperture 211 in the center. It is desirable that the aperture 211 has a point-symmetrical shape such as a circle or a regular polygon having an even number of vertices. The disk 21 with an aperture is disposed parallel to the XY plane and a peripheral edge thereof is held by the rotation stage 22. The rotation stage 22 as the rotation member is a member that rotatably supports the disk 21 with an aperture at a desired angle with a Z direction as a rotation axis 221. The rotation stage 22 has a chuck that is a hollow ring-shaped member. The disk 21 with an aperture is placed on the chuck of the rotation stage 22 so that a center of the aperture 211 coincides with the rotation axis 221 as much as possible.

Figure 2:
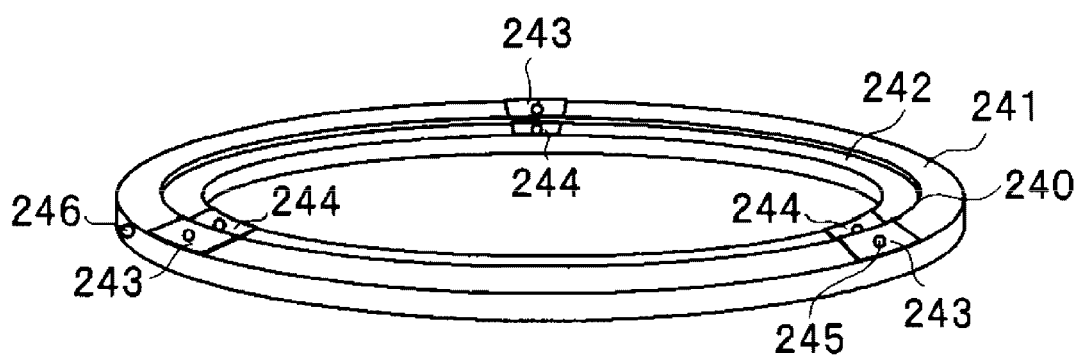
FIG. 2 is a perspective view of a vacuum suction ring.
Figure 2:
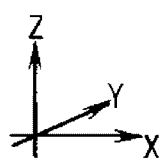

The subject 41 is, for example, a silicon wafer on which a semiconductor device is formed. The subject 41 is held by the vacuum suction ring 24 and is placed under the disk 21 with an aperture so that a surface thereof is parallel to the disk 21 with an aperture. FIG. 2 is a perspective view of the vacuum suction ring. As shown in FIG. 2, the vacuum suction ring 24 as the fixing member is a ring-shaped member having an opening at a center. There is a step 240 on an upper surface, and an upper surface (first surface) of an inner peripheral ring 242 located inside the step 240 is formed lower than an upper surface (second surface) of an outer peripheral ring 241 located outside the step 240. The inner peripheral ring 242 is a holding portion of the subject 41, and the outer peripheral ring 241 is a connecting portion with the disk 21 with an aperture. That is, the subject 41 is placed on the upper surface of the inner peripheral ring 242 in a state where the surface (surface on which a pattern is formed) faces upward. Further, the disk 21 with an aperture is placed on the upper surface of the outer peripheral ring.

Figure 3:
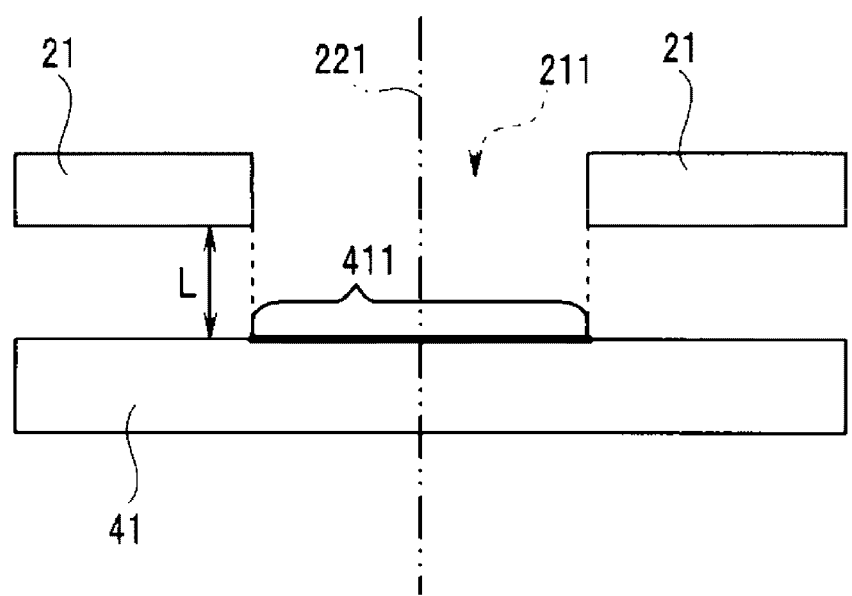
FIG. 3 is a schematic view showing a positional relationship between a disk with an aperture held in a vacuum suction ring and a subject.
Figure 3:
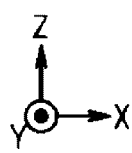

FIG. 3 is a schematic view showing a positional relationship between the disk 21 with an aperture and the subject 41 held by the vacuum suction ring 24. FIG. 3 is an enlarged view of a rectangular region A shown by a dotted line in FIG. 1. Assuming that a pixel pitch of the one-dimensional detector 14 described later is P, a wavelength of X-rays emitted from the light source 11 is λ, and an imaging magnification by the imaging mirror 13 described later is M, it is desirable that a distance L between an upper surface of the subject 41 and a lower surface of the disk 21 with an aperture is set to $P^2/\{(M^2)\times\lambda\}$ or less. By setting in this way, it is possible to prevent the influence of Fresnel interference fringes due to the aperture 211. That is, a height of the step 240 of the vacuum suction ring 24 is set such that the distance L between the upper surface of the subject 41 and the lower surface of the disk 21 with an aperture is $P^2/\{(M^2)\times\lambda\}$ or less when the subject 41 and the disk 21 with an aperture are placed on the vacuum suction ring 24.

The vacuum suction ring 24 has a hollow structure. The inner peripheral ring 242 is provided with three vacuum suction ports 244. The upper surface of the vacuum suction port 244 is formed higher than the upper surface of the inner peripheral ring 242 by a predetermined height. Further, the outer peripheral ring 241 is also provided with three vacuum suction ports 243. The upper surface of the vacuum suction port 243 is formed higher than the upper surface of the outer peripheral ring 241 by a predetermined height. All vacuum suction ports 243 and 244 are provided with suction holes 245. Further, the outer peripheral ring 241 is provided with a connection hole 246 for connecting one end of the tube 26.

As shown in FIG. 1, a vacuum pump 25 is connected to the other end of the tube 26. By driving the vacuum pump 25 in a state where the subject 41 is placed on the upper surface of the inner peripheral ring 242 and the disk 21 with an aperture is placed on the upper surface of the outer peripheral ring, the upper surface of the vacuum suction port 244 and the lower surface of the subject 41 are fixed, and the upper surface of the vacuum suction port 243 and the lower surface of the disk 21 with an aperture are fixed by vacuum suction. That is, by the vacuum suction, the subject 41 and the disk 21 with an aperture are fixed to the vacuum suction ring 24 in a state of being supported by three points, respectively. At this time, after adjusting the position of the disk 21 with an aperture so that an observation target area of the subject 41 is exposed from the aperture 211 when viewed from above in the Z direction, the subject 41 and the disk 21 with an aperture are fixed to the vacuum suction ring 24 by the vacuum suction.

As described above, by fixing the subject 41 and the disk 21 with an aperture to the vacuum suction ring 24 by the vacuum suction, even when the disk 21 with an aperture is rotated during observation, it is possible to prevent a positional deviation between the disk 21 with an aperture and the subject 41. The subject 41, the vacuum suction ring 24, and the disk 21 with an aperture that are suction-fixed to each other are placed such that the center of the aperture 211 coincides with the rotation axis 221 of the rotation stage 22 as much as possible. Three or more vacuum suction ports 244 and 243 may be provided, respectively, and the subject 41 and the disk 21 with an aperture may be held at multiple points.

Figure 4:
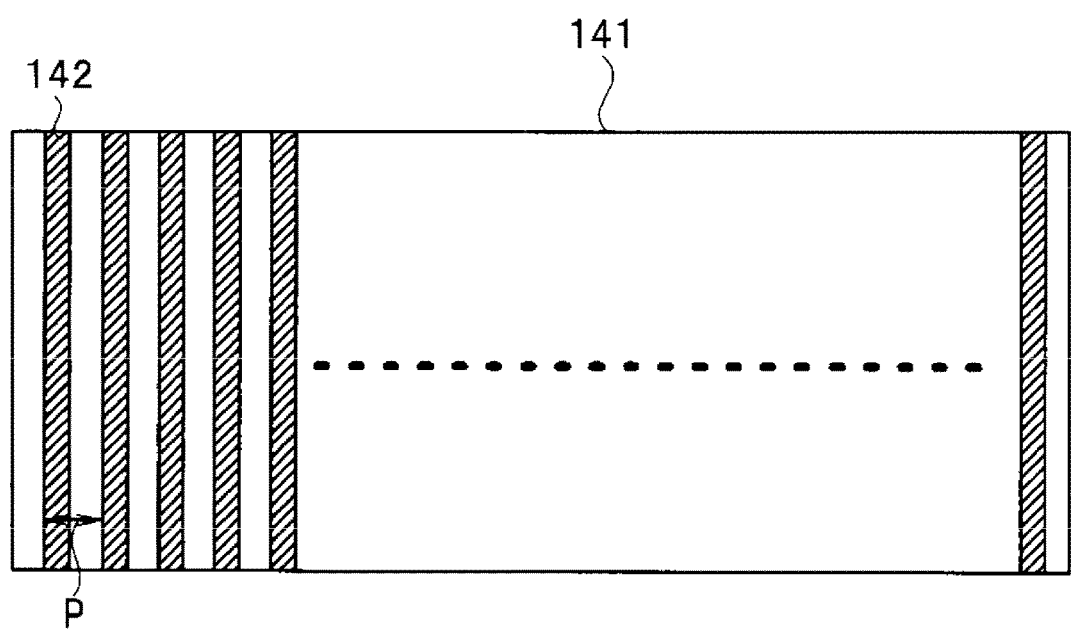
FIG. 4 is a schematic view showing a configuration of a one-dimensional detector.
Figure 4:
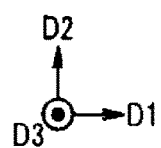

The imaging mirror 13 as the imaging optical member collects the X-rays that have passed through the aperture 211 and transmitted through the observation region 411 of the subject 41, and forms an image of the subject 41 on the detection surface 141 of the one-dimensional detector 14. The size of the detection surface 141 is sufficiently larger than the size of the image to be formed. FIG. 4 is a schematic view showing a configuration of the one-dimensional detector. As shown in FIG. 4, the one-dimensional detector 14 includes line-shaped pixels 142 extending in a D2 direction at equal intervals in a D1 direction in the detection surface 141. The D1 direction and the D2 direction are orthogonal to each other. The image of the subject 41 disposed parallel to an XY plane is formed on a D1-D2 plane of the detection surface 141. That is, the D1 direction of the detection surface 141 corresponds to the X direction of the subject 41. Further, the D2 direction of the detection surface 141 corresponds to the Y direction of the subject 41. As the one-dimensional detector 14, for example, a superconducting strip detector in which a plurality of superconducting strips (superconducting single photon detectors) are disposed is used. In order to reduce a cross-sectional area of the superconducting strip 142, which is the line-shaped pixels, to such an extent that division of the superconducting region occurs, a width and a thickness of the superconducting strip 142 are preferably 200 nm or less. In the following description, a sum of a width of one superconducting strip 142 and a distance between adjacent superconducting strips 142 is defined as the pixel pitch P.

Figure 5:
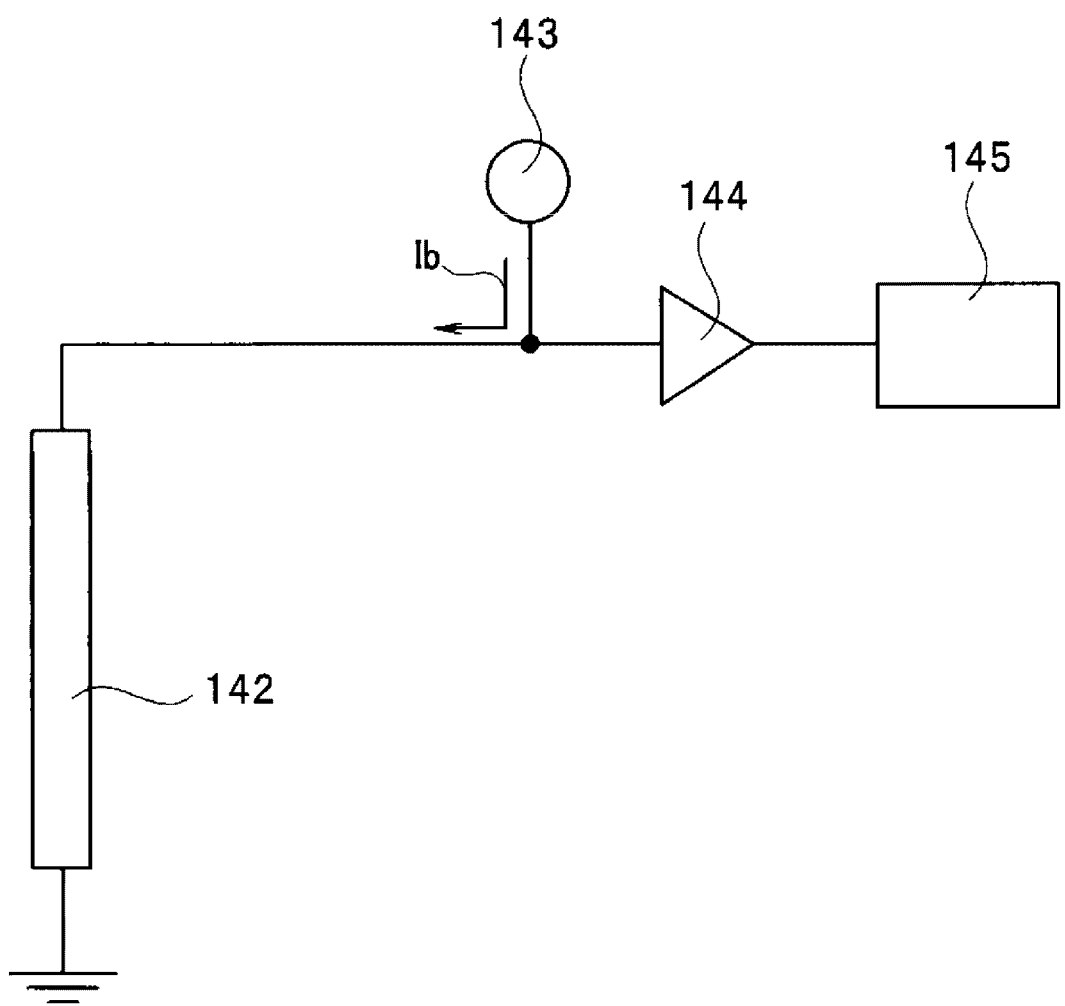
FIG. 5 is a principle circuit configuration diagram of a one-dimensional detector.

FIG. 5 is a principle circuit configuration diagram of the one-dimensional detector. As shown in FIG. 5, the one-dimensional detector 14 includes a current source 143 that is connected to one end of the superconducting strip 142 of which the other end is grounded, and supplies a bias current Ib to the superconducting strip 142, an amplifier 144 that amplifies an electric signal generated by the superconducting strip 142, and a measuring instrument 145 that counts a pulsed electric signal detected when the X-ray photon is detected based on an output signal of the amplifier 144. The current source 143, the amplifier 144, and the measuring instrument 145 may also be provided outside the one-dimensional detector 14. For example, the current source 143, the amplifier 144, and the measuring instrument 145 may be provided in the control analysis unit 31.

Figure 6:
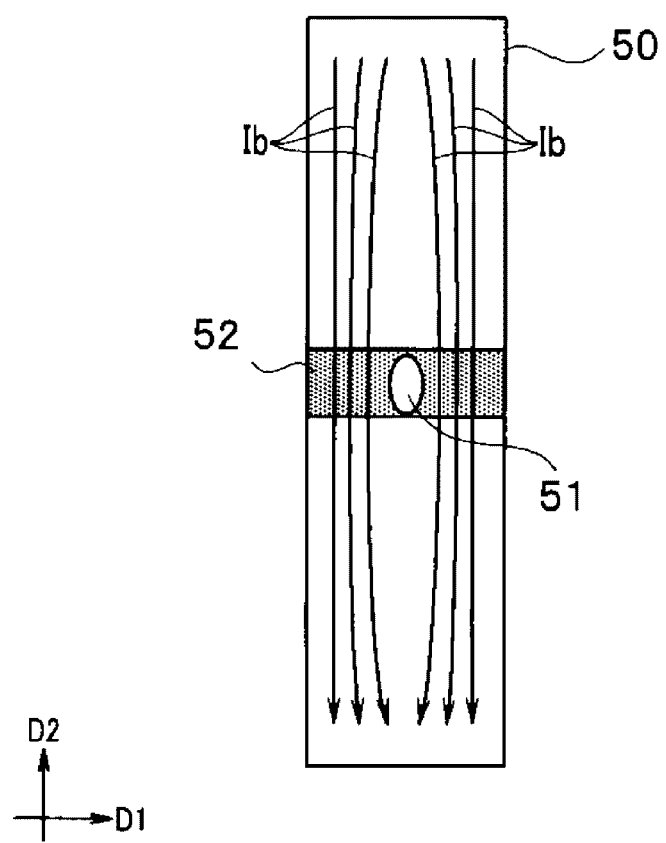
FIG. 6 is a view showing a detection principle of X-ray photons in a superconducting strip.

FIG. 6 is a view showing a detection principle of the X-ray photons in the superconducting strip. First, the superconducting strip 142 is cooled to a critical temperature or lower by a refrigerator (not shown) to be a superconducting state. Then, the bias current Ib slightly lower than a critical current for maintaining the superconducting state of the superconducting strip 142 is supplied from the current source 143. In this state, the X-ray photons are incident on the superconducting strip 142.

At this time, the width (length W in the D1 direction in FIG. 4) and the thickness of the superconducting strip 142 are about 200 nm, and the cross-sectional area of the superconducting strip 142 is small. Therefore, when the X-ray photons are absorbed by the superconducting strip 142, as shown in FIG. 5, a region (hotspot region) 51 that transfers to normal conduction called a hotspot is formed in the superconducting region 50 of the superconducting strip 142. Since an electrical resistance of the hotspot region 51 increases, as shown in FIG. 6, the bias current Ib bypasses the hotspot region 51 and flows in a detour region 52, which is another region.

When a current that is a critical current or more flows in the detour region 52, the detour region 52 transfers to normal conduction, the electrical resistance increases, and finally the superconducting region 50 is divided. That is, a state where the superconducting region of the superconducting strip 142 described above is divided (divided state) occurs. After that, the hotspot region 51 and the detour region 52 that have transferred to normal conduction rapidly disappear by cooling, so that the pulsed electric signal is generated by a temporary electrical resistance generated by the division of the superconducting region 50. The number of the X-ray photons can be measured by amplifying the pulsed electric signal by the amplifier 144 and counting it by the measuring instrument 145. The number of the X-ray photons (photons) for each superconducting strip 142 counted by the measuring instrument 145, that is, the detection result of the one-dimensional detector 14, is output to the control analysis unit 31.

The control analysis unit 31 as an image processing unit analyzes the detection result output from the one-dimensional detector 14 and reconstructs the image of the subject 41. For the control analysis unit 31, for example, a personal computer equipped with a central processing unit (CPU) and a memory (RAM) can be used. An operation of reconstructing the image of the subject 41 is performed by software, for example, by being stored in the memory as a program in advance and being executed in the CPU. Further, the operation of reconstructing the image of the subject 41 may be performed by one or more processors configured as hardware. For example, it may be a processor configured as an electronic circuit, or may be a processor implemented by an integrated circuit such as a Field Programmable Gate Array (FPGA). Further, the control analysis unit 31 outputs a control signal to the stage drive unit 23 that rotates the rotation stage 22, and instructs rotation timing, rotation angle, and the like.

Figure 7:
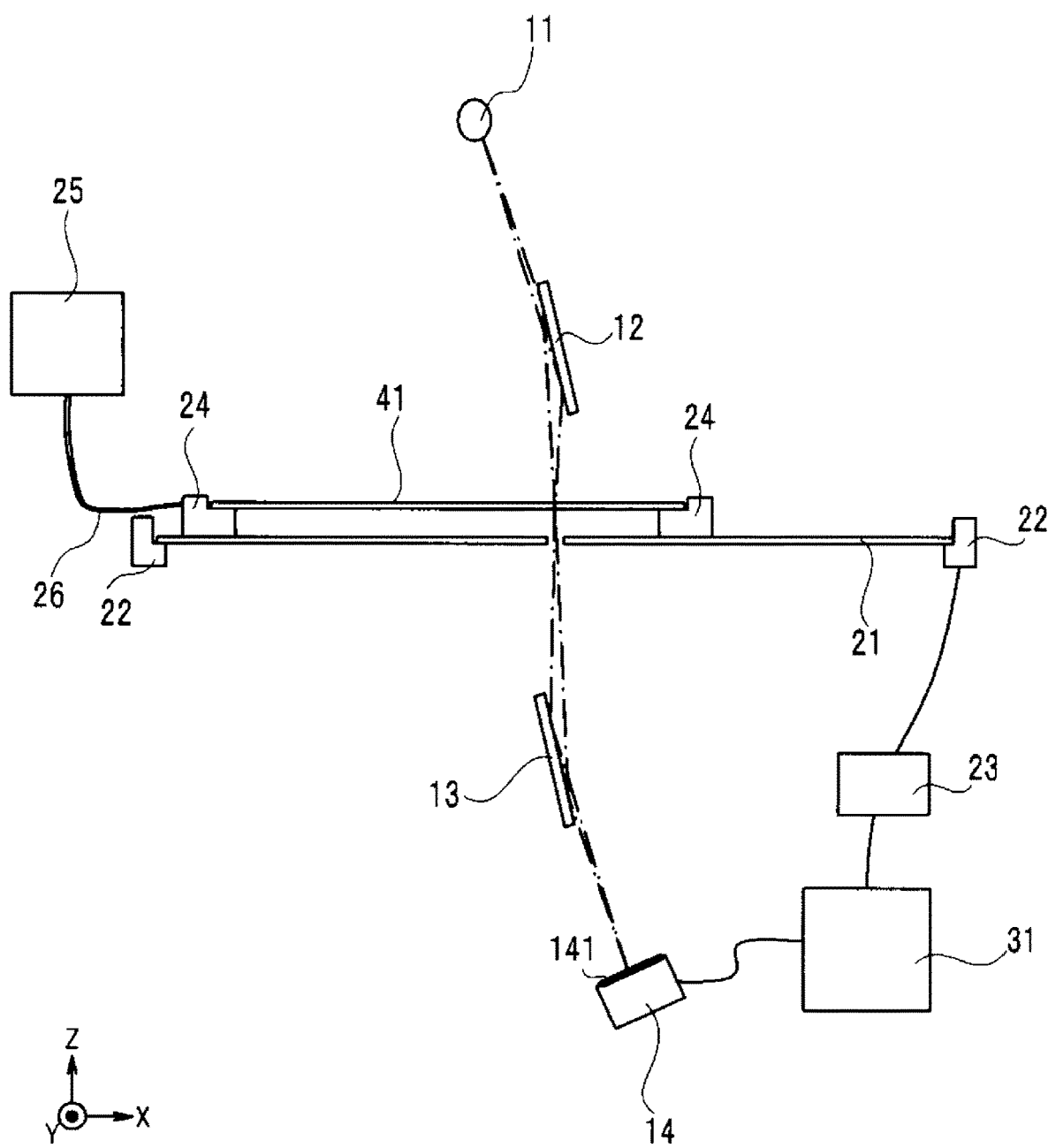
FIG. 7 is a schematic view showing another configuration example of the image pickup device of the embodiment.

The image pickup device of the embodiment is not limited to the configuration in which the subject 41 is disposed below the disk 21 with an aperture as shown in FIG. 1, and may be a configuration in which the subject 41 is disposed above the disk 21 with an aperture as shown in FIG. 7. FIG. 7 is a schematic view showing another configuration example of the image pickup device of the embodiment. In the case of the image pickup device having the configuration shown in FIG. 7, the vacuum suction port 243 of the vacuum suction ring 24 is disposed on the lower surface of the outer peripheral ring 241. The lower surface of the vacuum suction port 243 is formed higher than the lower surface of the outer peripheral ring 241 by a predetermined height, and the lower surface of the vacuum suction port 243 and the upper surface of the disk 21 with an aperture are fixed by the suction holes 245 provided in the vacuum suction port 243. After adjusting the position of the disk 21 with an aperture such that the observation region 411 of the subject 41 is exposed from the aperture 211 when viewed from below in the Z direction, the subject 41 and the disk 21 with an aperture are fixed to the vacuum suction ring 24 by the vacuum suction. That is, in the case of the configuration shown in FIG. 7, the subject 41 is placed on the inner peripheral ring 242 in a state where a back surface (surface on which the pattern is not formed) faces upward.

Figure 8B:
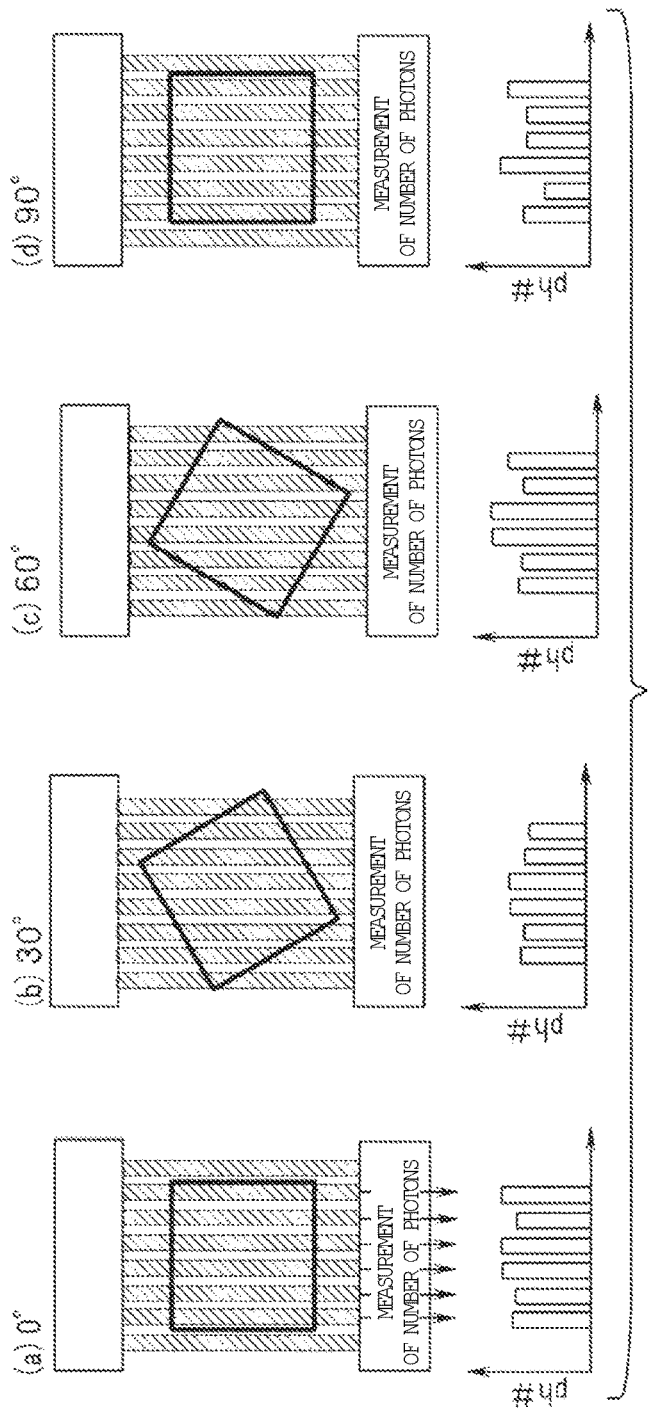
FIGS. 8A to 8D are explanatory views of image reconstruction.
Figure 8D:
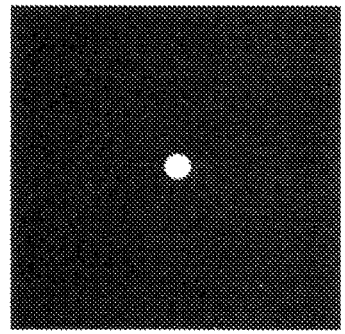
Figure 8C:
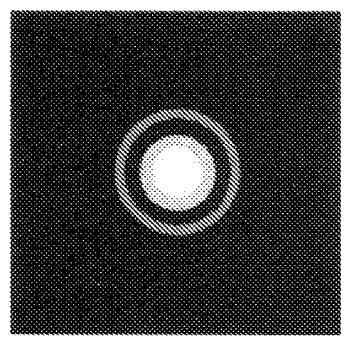
Figure 8A:
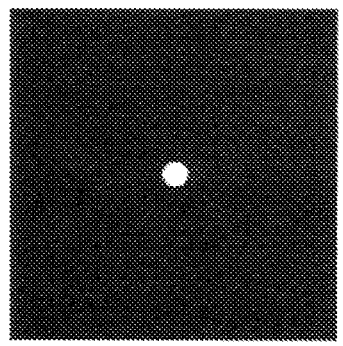

Next, an image generation method will be described. Prior to the image generation method of at least one embodiment, an image generation method of a comparative example will be described. FIGS. 8A to 8D are explanatory views of image reconstruction. A case of observing the subject 41 in which the pattern as shown in FIG. 8A is formed will be described below as an example. First, as shown in FIG. 8B(a), the subject 41 is set on the rotation stage 22, and the subject 41 on the rotation stage 22 is irradiated with the X-rays from the light source 11. In each of FIG. 8B(a) to (d), the upper part is a view showing a positional relationship between the subject 41 and the pixels 142 of the one-dimensional detector 14, and the lower part is an example of an image intensity profile. In the upper view of FIG. 8B(a) to (d), the subject 41 is shown by a thick line rectangle, and the line-shaped pixels 142 are shown by a diagonal hatched band-shaped rectangle. Further, FIG. 8B(a), (b), (c), and (d) show cases where the rotation angles are 0°, 30°, 60°, and 90°, respectively.

Then, the X-rays transmitted through the subject 41 are formed on the detection surface 141 of the one-dimensional detector 14. In the one-dimensional detector 14, the number of X-ray photons (#ph) is measured for each line-shaped pixel (superconducting strip) 142 by counting the pulsed electric signal generated by the division of the superconducting region 50 by the measuring instrument 145. Then, by plotting the X-ray intensity (number of the X-ray photons) detected by each pixel 142 with respect to the coordinates of each pixel, an image intensity profile as shown in FIG. 8B(a) is acquired. That is, the image intensity profile when the rotation angle of the subject 41 is 0° is acquired.

Similarly, while rotating the rotation stage 22 by any rotation angle (AG), the image intensity profile is acquired at each rotation angle (FIG. 8B(b) to (d)). Then, an image is reconstructed from all the obtained image intensity profiles using a projection-slice theorem, and an image of the subject 41 is acquired. Specifically, the image intensity profile acquired at each rotation angle is Fourier-transformed, and contour lines of the profile after the Fourier transform at all rotation angles are created to generate a Fourier-transformed image of the X-ray transmission image of the subject 41. FIG. 8C is a diagram schematically showing the generated Fourier transform image. The X-ray transmission image of the subject 41 is reconstructed by performing an inverse Fourier transform on the Fourier transform image of the X-ray transmission image of the subject 41. FIG. 8D shows an image of the reconstructed subject 41.

Figure 9A:
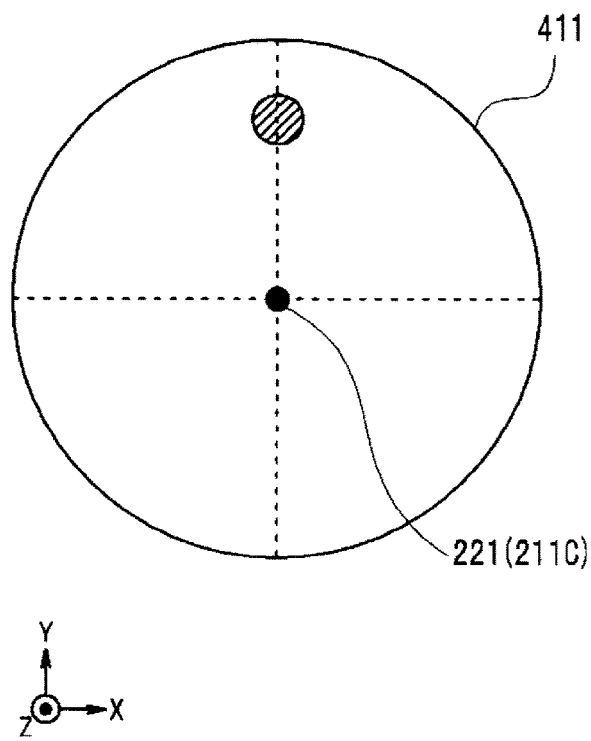
FIGS. 9A and 9B are views showing a position of a subject (observation region) at each rotation angle.
Figure 9B:
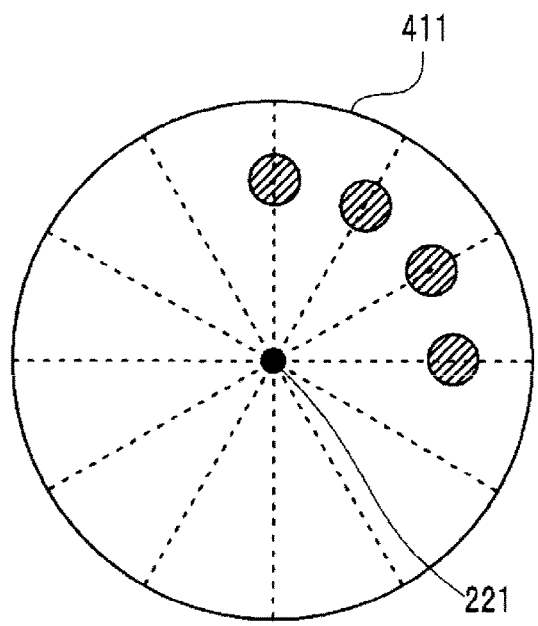

When generating the image, the image intensity profile is acquired at each rotation angle while rotating the rotation stage 22 at any rotation angle (As) in a state where the rotation axis 221 of the rotation stage 22 and the center of the observation region 411 of the subject 41, that is, the center 211C of the aperture 211 coincide with each other. In the image generation method of the comparative example described above, there is a possibility that the position of the rotation axis 221 deviates from the center 211C of the aperture 211 at the time of setting or during the rotation due to a mechanical error of the rotation stage 22 or the like. FIGS. 9A to 10B are views showing the position of the subject (observation region) at each rotation angle, in which FIGS. 9A and 9B show a case where the rotation axis and the center of the aperture coincide with each other, and FIGS. 10A and 10B show a case where the rotation axis and the center of the aperture do not coincide with each other.

A case will be described in which the observation region 411 having a dotted line pattern in the X direction and the Y direction and having a circular pattern on the dotted line extending in the Y direction is rotated through the center 211C. As shown in FIG. 9A, when the position of the rotation axis 221 coincides with the center 211C of the aperture 211, the position of the center 211C of the aperture does not change even if the rotation stage 22 is rotated. FIG. 9B is a view showing the observation region 411 superimposed when the rotation stage 22 is rotated by 0°, 30°, 60°, and 90°. When the rotation axis 221 coincides with the center 211C, as shown in FIG. 9B, the position of the aperture 211 does not change and the position of the center 211C also does not change even if the rotation angle is advanced.

Figure 10A:
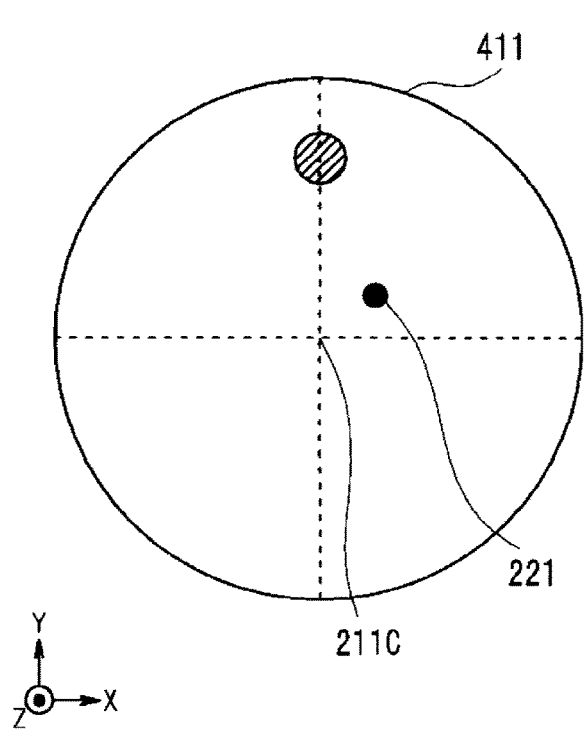
FIGS. 10A and 10B are views showing a position of a subject (observation region) at each rotation angle.
Figure 10B:
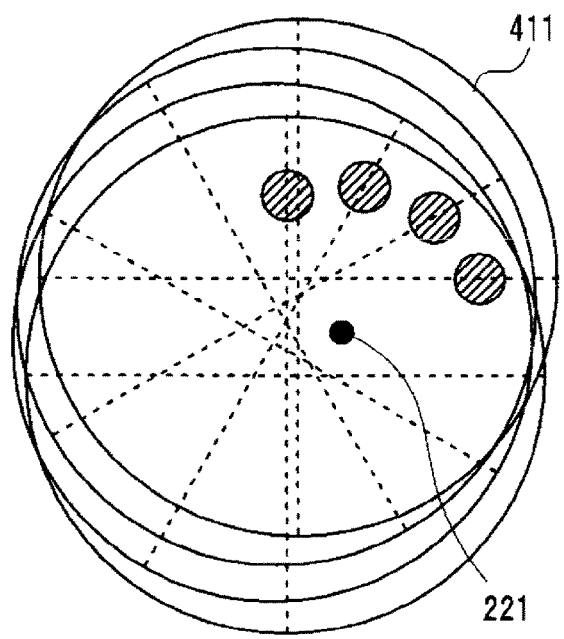

On the other hand, as shown in FIG. 10A, when the position of the rotation axis 221 does not coincide with the center 211C of the aperture 211, the position of the center 211C of the aperture changes when the rotation stage 22 is rotated. FIG. 10B is a view showing the observation region 411 superimposed when the rotation stage 22 is rotated by 0°, 30°, 60°, and 90°. When the rotation axis 221 does not coincide with the center 211C, as shown in FIG. 10B, the position of the aperture 211 changes and the position of the center 211C also changes in the X direction and the Y direction when the rotation angle advances.

Figure 11:
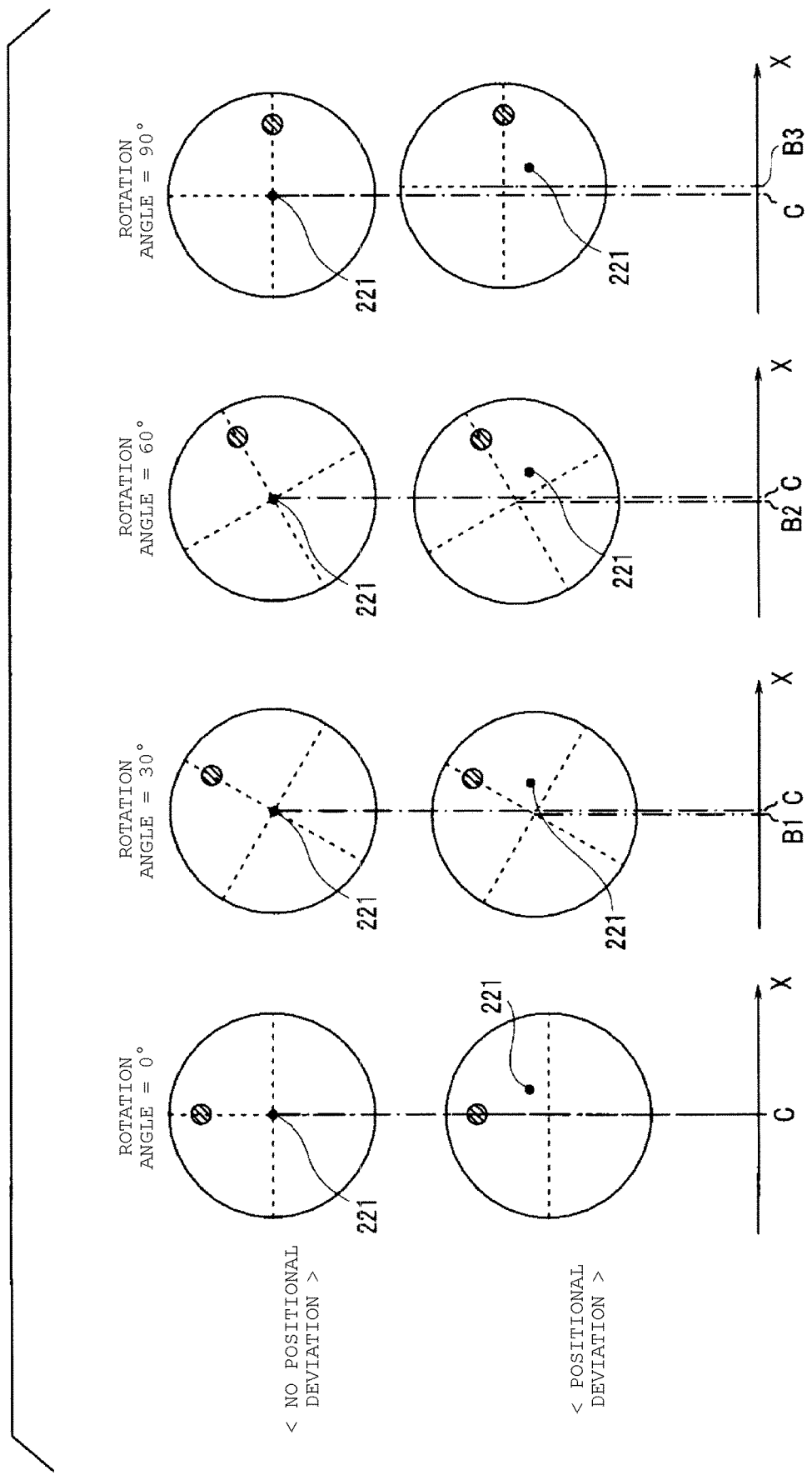
FIG. 11 is a view showing a positional deviation of a center of the aperture due to a rotation axis deviation.

FIG. 11 is a view showing a positional deviation of the center of the aperture due to a positional deviation of the rotation axis. In the drawings of 2 rows×4 columns=8 observation regions 411 shown in FIG. 11, the upper 4 regions show the case where the rotation axis 221 coincides with the center 211C of the aperture (no positional deviation), and the lower 4 regions show the case where the rotation axis 221 and the center 211C of the aperture deviate (there is the positional deviation). From the left end to the right end, the first column shows the position of the observation region 411 when the rotation angle is 0°, the second column shows the position of the observation region 411 when the rotation angle is 30°, the third column shows the position of the observation region 411 when the rotation angle is 60°, and the fourth column shows the position of the observation region 411 when the rotation angle is 90°.

As shown in the first column, let the X coordinate of the center of the aperture be C when the rotation angle is 0°. When the rotation angle is 30° (second column) and there is no positional deviation, the X coordinate of the center of the aperture remains C. On the other hand, when there is a positional deviation, the X coordinate of the center of the aperture is B1, that is, moves to the position different from C. When the rotation angle becomes 60° (third column), the X coordinate of the center of the aperture remains C if there is no positional deviation, and the X coordinate of the center of the aperture is B2 if there is a positional deviation, and a distance to C is large. When the rotation angle becomes 90° (fourth column), the X coordinate of the center of the aperture remains C if there is no positional deviation, and the X coordinate of the center of the aperture is B3 if there is a positional deviation, and the distance to C is further large.

In this way, when the image intensity profile is acquired while rotating the rotation stage 22 in a state where the position of the rotation axis 221 deviates from the center 211C of the aperture 211, the X-ray photons are detected in the pixels that are different from the pixels that should be originally detected. When the image is reconstructed by using the projection-slice theorem, since the image intensity profile is integrated based on the pixel position, if the position of the center 211C of the aperture deviates by the rotation angle due to the positional deviation of the rotation axis 221, the correct integration cannot be performed and the accuracy of the reconstruction image is lowered.

Figure 12:
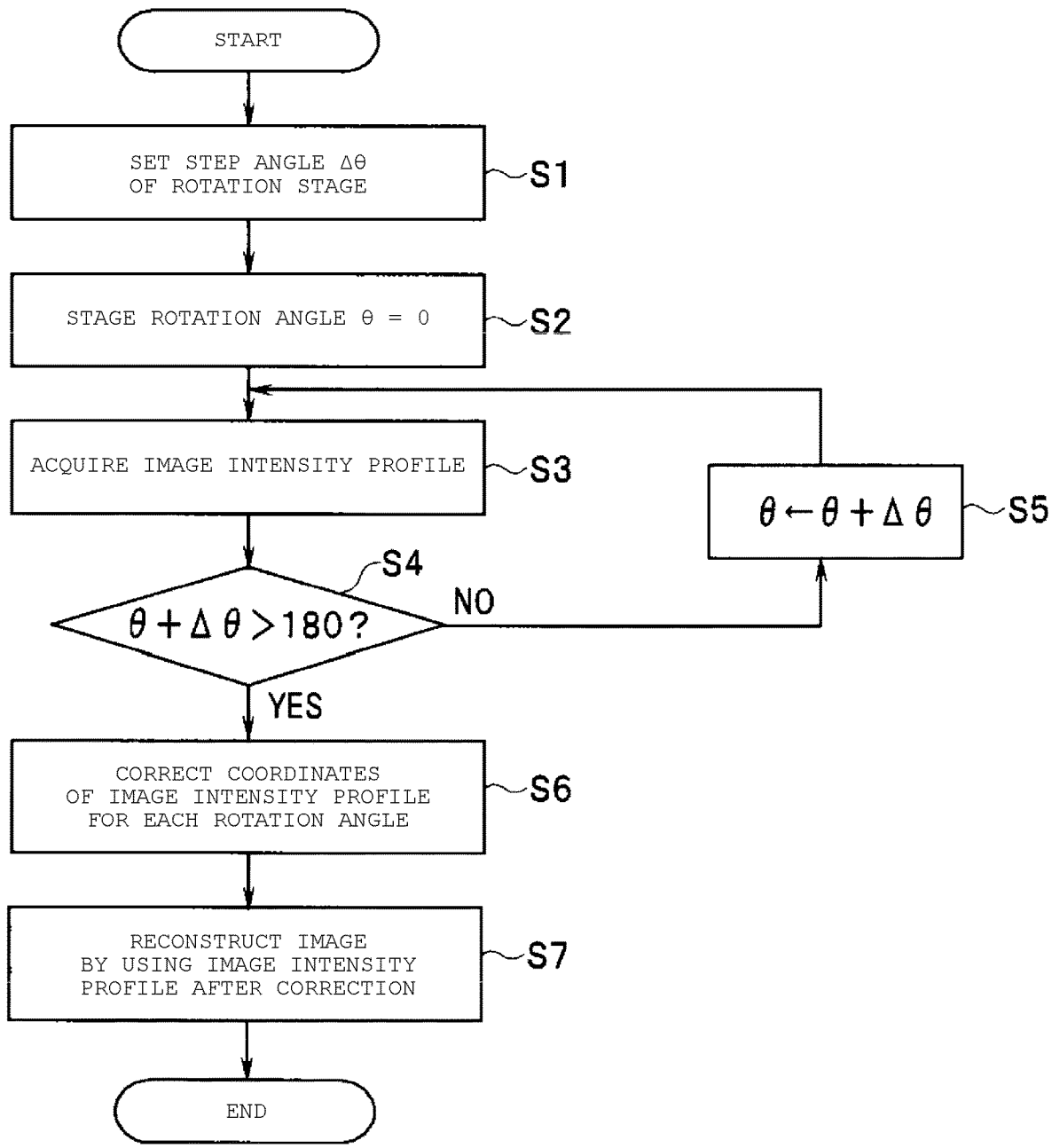
FIG. 12 is a flowchart showing an example of an image generation method according to a first embodiment.

Therefore, in the image generation method of at least one embodiment, in the image intensity profile for each rotation angle, the image is reconstructed after calculating the amount of the positional deviation of the center 211C of the aperture 211 and correcting the position of the image intensity profile. Hereinafter, the image generation method of the embodiment will be described with reference to FIG. 12. FIG. 12 is a flowchart showing an example of an image generation method according to a first embodiment.

Prior to the observation, the subject 41 is placed on the rotation stage 22 as a preparation before the observation. That is, the subject 41 and the disk 21 with an aperture are positioned so that the region that is the observation target of the subject 41 is exposed from the aperture 211 of the disk 21 with an aperture when viewed from the Z direction, and both are fixed by the vacuum suction ring 24. Then, the disk 21 with an aperture is fixed to the rotation stage 22, and the placement of the subject 41 is completed.

When the preparation described above is completed, observation (image generation) is started. First, the step angle Δθ of the rotation stage 22 is set (S1). The step angle Δθ is an interval between angles for acquiring the image intensity profile. In normal observation, the image intensity profile is acquired while rotating the rotation stage 22 in a range of 0° or more and less than 180°. Next, the rotation angle θ of the rotation stage 22 is set to 0° (initial value) (S2).

The image intensity profile of the subject 41 is acquired by irradiating the X-rays from the light source 11 (S3). When θ+Δθ is less than 180° (maximum value of the observation angle) (S4, NO), the step angle Δθ is added to the current rotation angle θ to calculate the next rotation angle θ, and the rotation stage 22 is rotated to the next rotation angle θ (S5). Then, S3 is executed, and the image intensity profile at the set rotation angle θ is acquired.

Figure 13:
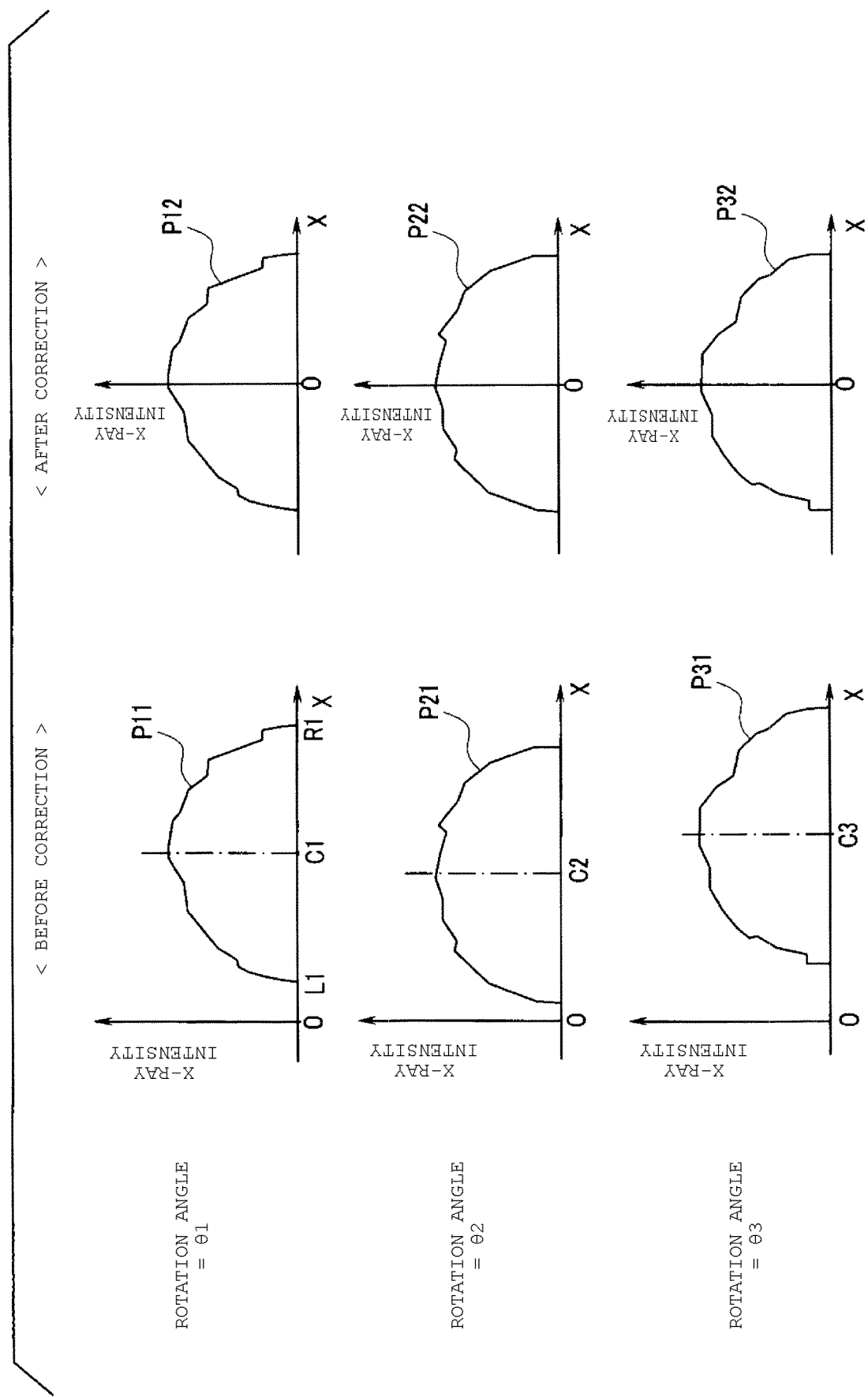
FIG. 13 is a diagram showing a position correction method of an image intensity profile in the first embodiment.

On the other hand, when θ+Δθ is 180° (maximum value of the observation angle) or more (S4, YES), the acquisition of the image intensity profile in the set rotation angle range is completed, so that the process proceeds to S6. In S6, the position of the acquired image intensity profile is corrected for each rotation angle. FIG. 13 is a diagram showing a method for correcting the position of the image intensity profile in the first embodiment. In 3 rows×2 columns=6 image intensity profiles shown in FIG. 13, the left column shows the profile before correction, and the right column shows the profile after correction. The upper row shows the profile when the rotation angle is θ1, the middle row shows the profile when the rotation angle is θ2, and the lower row shows the profile when the rotation angle is θ3. For example, the image intensity profile acquired at the rotation angle θ is the profile P11 shown on the left side of the upper row, and the profile obtained by correcting the position thereof is the profile P12 shown on the right side of the upper row. The position correction of the image intensity profile in S6 will be described with reference to FIG. 13.

First, the pixel position of the center 211C of the aperture is estimated in the image intensity profile acquired for each rotation angle. When the aperture 211 is circular, assuming that at least a part of the X-rays is transmitted in the entire observation region 411, it can be estimated that the pixel position where the intensity is maximum in the image intensity profile corresponds to the center 211C of the aperture. Alternatively, it may be estimated that the midpoint of the range (L1 to R1) where the X-ray intensity is observed in the image intensity profile corresponds to the center 211C of the aperture.

When the axis deviation of the rotation axis 221 does not occur, the position of the center 211C of the aperture of the image intensity profile is the same at all rotation angles. Therefore, the position of each image intensity profile is corrected so that the estimated position of the center 211C of the aperture is the same position in the image intensity profile at all rotation angles. For example, the coordinates are corrected so that the pixel position of the center 211C of the aperture in all the image intensity profiles comes to the origin point (X=0).

As shown in FIG. 13, when the pixel position of the center 211C of the aperture in the image intensity profile P11 of the rotation angle θ is estimated to be C1, the pixel position of the center 211C of the aperture in the image intensity profile P21 of the rotation angle θ2 is estimated to be C2, and the pixel position of the center 211C of the aperture in the image intensity profile P31 of the rotation angle θ3 is estimated to be C3, a correction method will be specifically described. The image intensity profile P11 of the rotation angle θ shown on the left side of the upper row shifts the image intensity profile to the negative side in the X direction only by C1 and is corrected to the image intensity profile P21 in which the pixel position of the center 211C of the aperture is 0 as shown on the right side of the upper row. The image intensity profile P21 of the rotation angle θ2 shown on the left side of the middle row shifts the image intensity profile to the negative side in the X direction only by C2, and is corrected to the image intensity profile P22 in which the pixel position of the center 211C of the aperture is 0 as shown on the right side of the middle row. The image intensity profile P31 of the rotation angle θ3 shown on the left side of the lower row shifts the image intensity profile to the negative side in the X direction only by C3, and is corrected to the image intensity profile P32 in which the pixel position of the center 211C of the aperture is 0 as shown on the right side of the lower row.

Finally, the X-ray transmission image of the observation region 411 is reconstructed by using the image intensity profiles of all the rotation angles corrected in S6 (S7), and a series of procedures relating to the image generation method of the embodiment is completed.

Second Embodiment

As described above, according to the image pickup device of at least one embodiment, since the positional relationship between the subject 41 and the aperture 211 is fixed by the vacuum suction ring 24, only the X-rays transmitting the observation region 411 are detected by the one-dimensional detector 14. Therefore, even if the rotation axis 221 of the rotation stage 22 fluctuates, the coordinates can be corrected from the obtained image intensity profile, and a highly accurate reconstruction image can be acquired. Next, a second embodiment will be described. In the image generation method of the present embodiment, the coordinate correction method of the image intensity profile is different from that of the first embodiment described above. Since the configurations of the image pickup device and the image forming apparatus are the same as those of the first embodiment described above, the description thereof will be omitted, and only the differences from the first embodiment will be described below.

Figure 14:
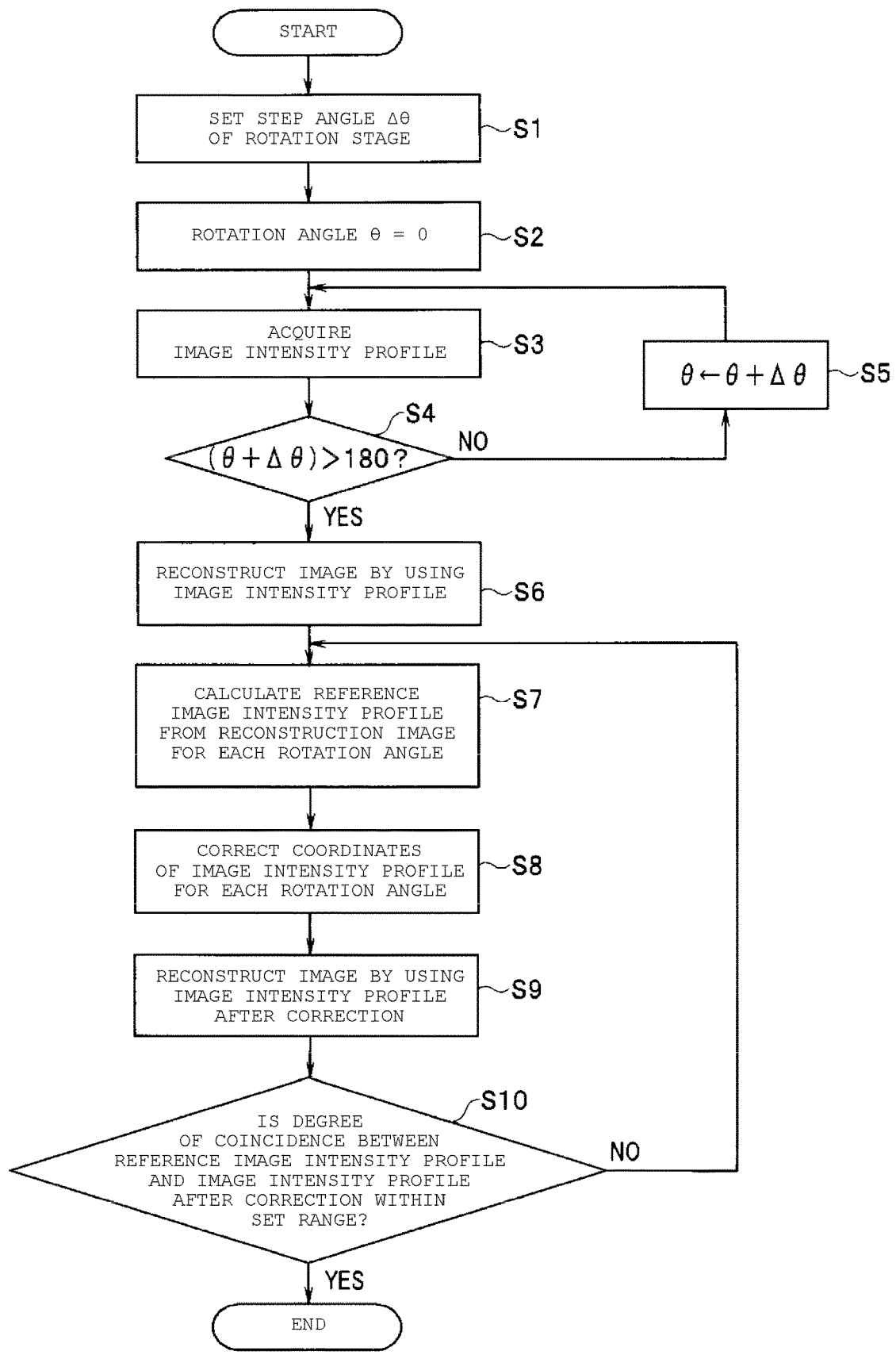
FIG. 14 is a flowchart showing an example of an image generation method according to a second embodiment.
Figure 15A:
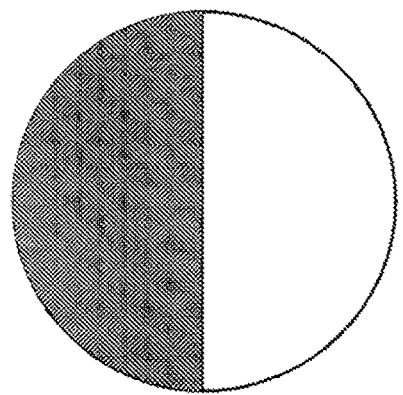
FIGS. 15A to 15C are views showing changes in a reconstruction image in the second embodiment.
Figure 15B:
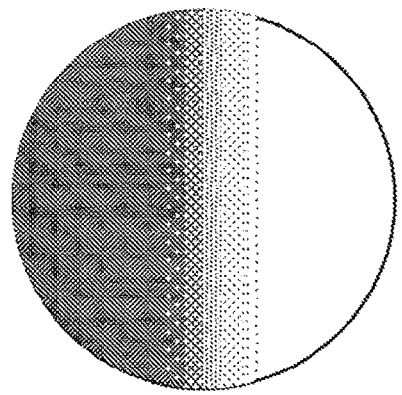
Figure 15C:
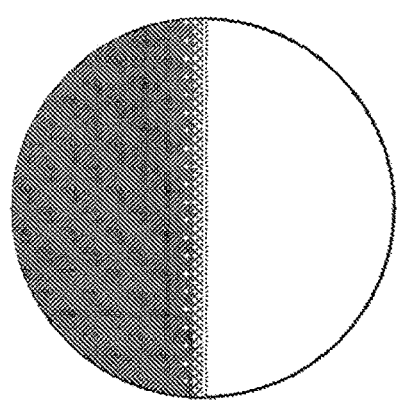

In the first embodiment described above, the coordinates are corrected by using the center of the image intensity profile. On the other hand, in the present embodiment, a reference image intensity profile is created from the reconstruction image and the coordinates of the image intensity profile are corrected. Hereinafter, the image generation method of the embodiment will be described with reference to FIGS. 14 to 16. FIG. 14 is a flowchart showing an example of the image generation method in the second embodiment. FIGS. 15A to 15C are views showing changes in the reconstruction image in the second embodiment. FIG. 16 is a diagram showing a position correction method of the image intensity profile in the second embodiment.

A preparation before the observation (placement of the subject 41 on the rotation stage 22) and each procedure of S1 to S5 are the same as the procedure of the first embodiment shown in FIG. 12, so the description thereof will be omitted. After the acquisition of the image intensity profile in the set rotation angle range is completed (S4, YES), the X-ray transmission image of the observation region 411 is reconstructed by using the obtained image intensity profile (S6). The image intensity profile used in S6 is the image intensity profile (without coordinate correction) acquired in S3. As shown in FIG. 15A, in a case of observing the observation region 411 in which the pattern is formed such that the X-rays are difficult to transmit through the left half region and the X-rays are easy to transmit through the right half region by using the circular aperture 211, when the axis deviation of the rotation axis 221 occurs, for example, as shown in FIG. 15B, an image in which a boundary between the region where the X-rays are difficult to transmit and the region where X-rays are easy to transmit is blurred is reconstructed.

Next, the image intensity profile for each rotation angle is calculated from the generated reconstruction image (S7). Specifically, the image intensity of the obtained reconstruction image is integrated in the direction of the tilt angle θ. The reference image intensity profile is created by plotting the integrated values with the direction orthogonal to the angle θ as the X coordinate axis. The reconstruction image obtained at this time corresponds to the image of the observation region 411. In this way, the reference image intensity profile is calculated for each of all the rotation angles for which the image intensity profile was acquired in S3.

The reference image intensity profile integrated in the direction of the tilt angle θ corresponds to the image intensity profile acquired at the rotation angle θ. At the same angle θ, the reference image intensity profile generated in S7 and the image intensity profile acquired in S3 are compared, and the coordinates of the image intensity profile are corrected so that the both coincide most with each other (S8).

In 3 rows×3 columns=9 image intensity profiles shown in FIG. 16, the left column shows the profile (measurement profile) before correction acquired in S3. The middle column shows the reference image intensity profile (reference profile) generated in S7. Further, the right column shows the image intensity profile (corrected profile) coordinate-corrected in S8. The upper row shows the profile when the rotation angle is θ1, the middle row shows the profile when the rotation angle is θ2, and the lower row shows the profile when the rotation angle is θ3. For example, the image intensity profile acquired at the rotation angle θ1 is the profile P11 shown on the left side of the upper row. The reference image intensity profile at the angle θ1 which is created from the image reconstructed by using the measurement profile shown in the left column is the profile Pr11 shown in the middle of the upper row. The profile P11 of which the position is corrected based on the profile Pr11 is the profile Pc11 shown on the right side of the upper row.

For example, the coordinate correction of S8 may be corrected so that the coordinates at which the X-ray intensity peaks coincide with each other, may be corrected so that an area of a difference region between the image intensity profile acquired in S3 and the reference image intensity profile is minimized, or may be corrected by using other logic. FIG. 16 shows, as an example, when the coordinates at which the X-ray intensity peaks are corrected so as to coincide with each other. For example, at the rotation angle θ2, the position where the X-ray intensity peaks in the measurement profile P12 is defined as C12, and the position where the X-ray intensity peaks in the reference profile Pr12 is defined as Cr12. The measurement profile P12 is shifted in the X direction by (Cr12-C12) so that the position where the X-ray intensity peaks is Cr12, and the corrected profile Pc21 is generated. The image intensity profiles of other rotation angles are similarly corrected.

Subsequently, the X-ray transmission image of the observation region 411 is reconstructed by using the image intensity profile corrected in S8 (S9). When the corrected image intensity profile and the reference image intensity profile are compared, and the difference between the both exceeds a predetermined range (degree of coincidence is less than the predetermined range) (S10, NO), the process returns to S7, and the reference image intensity profile is calculated by using the reconstruction image generated in S9. As a parameter indicating the difference (degree of coincidence) between the both in S10, for example, the difference in image intensity between the both at each coordinate can be used.

When the difference between both is within the predetermined range (degree of coincidence reaches the predetermined range) (S10, YES), the reconstruction image generated in S9 is used as the X-ray transmission image of the observation region 411, and the series of procedures relating to the image generation method of at least one embodiment is completed. FIG. 15C shows a reconstruction image after repeating the procedure of S7 to S10 m times. As described above, by repeatedly executing the generation of the reference image intensity profile and the correction of the image intensity profile, the degree of blurring of the boundary between the region where the X-rays are difficult to transmit and the region where the X-rays are easily transmitted due to the rotation axis deviation can be reduced, and an image close to the observation region 411 shown in FIG. 15A is obtained.

As described above, according to the image generation method of at least one embodiment, the coordinates of the image intensity profile can be accurately corrected even when it is difficult to determine the center 211C of the aperture based on the image intensity profile or when the shape of the aperture 211 is not point-symmetrical. Therefore, a highly accurate reconstruction image can be acquired.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An image pickup device comprising:
   a sample holding plate having an aperture, the aperture arranged to transmit imaging light applied to a subject;
   a fixing member having a first surface arranged to fix the subject, and a second surface arranged to fix the sample holding plate, the second surface formed in parallel with the first surface at a height different from that of the first surface, and the fixing member arranged to fix a position of the aperture with respect to the subject;
   a rotation member arranged to hold the subject and the sample holding plate fixed by the fixing member, and the rotation member configured to rotate at a desired angle about a rotation axis along a direction perpendicular to a surface of the subject;
   a detector;
   a plurality of line-shaped pixels having a line-shaped light receiving surface extending in a first direction disposed side by side on the detector in a second direction orthogonal to the first direction;
   an imaging optical member configured to form an image of the imaging light transmitting through the subject and the aperture on a detection surface of the detector; and
   an image processor configured to correct coordinates of an image intensity profile detected by the detector and to reconstruct an image of the subject from the image intensity profile after correction.

2. The image pickup device according to claim 1, wherein a distance, from an upper surface of the subject fixed to the first surface to the second surface, is equal to or less than a value obtained by dividing a square of a pixel pitch of the line-shaped pixel of the detector by a product of a square of a magnification of the imaging optical member and a wavelength of the imaging light.

3. The image pickup device according to claim 1, wherein the line-shaped pixel is a superconducting single photon detector.

4. The image pickup device according to claim 1, wherein the image processor is configured to correct the coordinates of the image intensity profile based on center coordinates of the image intensity profile detected by the detector.

5. The image pickup device according to claim 1, wherein the image processor is configured to calculate a reference image intensity profile by integrating the image of the subject reconstructed from the image intensity profile in a direction of an angle at which the subject is rotated by the rotation member, and correct the coordinates of the image intensity profile based on the reference image intensity profile.

6. The image pickup device according to claim 5, wherein the reconstruction of the image of the subject and the correction of the coordinates of the image intensity profile are repeatedly executed until a difference between the reference image intensity profile and the image intensity profile falls within a preset allowable range.

7. An image generation method of irradiating a subject, which is fixedly placed at a predetermined distance from a sample holding plate, with imaging light, detecting imaging light transmitted through an aperture formed in the sample holding plate in the imaging light transmitted through the subject each time the subject is rotated, generating an image intensity profile for each rotation angle while rotating the subject by a predetermined angle, and reconstructing an image of the subject by using the image intensity profile, the image generation method comprising:

calculating center coordinates of the image intensity profile for all the rotation angles;

correcting coordinates of the image intensity profile by regarding the center coordinates as coordinate origin points, for all the rotation angles; and reconstructing the image of the subject by using the image intensity profile after the coordinate correction.

8. An image generation method of irradiating a subject, which is fixedly placed at a predetermined distance from a sample holding plate, with imaging light, detecting imaging light transmitted through an aperture formed in the sample holding plate in the imaging light transmitted through the subject each time the subject is rotated, and generating an image intensity profile for each rotation angle while rotating the subject by a predetermined angle, and reconstructing an image of the subject by using the image intensity profile, the image generation method comprising:

calculating a reference image intensity profile by integrating the image of the subject reconstructed from the image intensity profile in a direction of an angle at which the subject is rotated by a rotation member; and correcting coordinates of the image intensity profile based on the reference image intensity profile, for all the rotation angles.

9. The image pickup device according to claim 1, wherein the image pickup device is a transmission x-ray microscope.

10. The image pickup device according to claim 1, wherein the fixing member includes a vacuum suction ring arranged to hold the subject.

11. The image pickup device according to claim 1, wherein the detector includes an x-ray detector.

12. The image pickup device according to claim 1, wherein the detector is a one dimensional detector.

13. The image pickup device according to claim 1, wherein the imaging optical member includes an imaging mirror.

14. The image pickup device according to claim 1, wherein the imaging processor is configured to reconstruct the image of the subject by performing inverse Fourier transform on a Fourier transformed image of the transmission image of the subject.

15. The image pickup device according to claim 1, wherein the imaging processor is configured to reconstruct the image of the subject using projection-slice theorem.

* * * * *